US012730998B2

(12) United States Patent
Momose

(10) Patent No.: US 12,730,998 B2
(45) Date of Patent: Sep. 8, 2026

(54) CARD READER AND CARD PULLING-OUT DETECTION METHOD

(71) Applicant: NIDEC INSTRUMENTS CORPORATION, Nagano (JP)

(72) Inventor: Munemasa Momose, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 96 days.

(21) Appl. No.: 18/874,093

(22) PCT Filed: Jun. 13, 2023

(86) PCT No.: PCT/JP2023/021925
§ 371 (c)(1),
(2) Date: Dec. 12, 2024

(87) PCT Pub. No.: WO2023/243632
PCT Pub. Date: Dec. 21, 2023

(65) Prior Publication Data

US 2026/0203539 A1 Jul. 16, 2026

(30) Foreign Application Priority Data

Jun. 17, 2022 (JP) ................................ 2022-097751

(51) Int. Cl.
*G06K 13/067* (2006.01)

(52) U.S. Cl.
CPC .................................. *G06K 13/067* (2013.01)

(58) Field of Classification Search
CPC .................................................... G06K 13/067
USPC .......................................................... 235/477
See application file for complete search history.

(56) References Cited

U.S. PATENT DOCUMENTS

2014/0008438 A1 1/2014 Kitazawa
2018/0129833 A1 5/2018 Orii
2023/0059789 A1 * 2/2023 Momose ............. G06K 13/067

FOREIGN PATENT DOCUMENTS

| JP | 2002370844 | 12/2002 |
|---|---|---|
| JP | 2003256781 | 9/2003 |
| JP | 2014013537 | 1/2014 |
| JP | 2018055573 | 4/2018 |

OTHER PUBLICATIONS

"International Search Report (Form PCT/ISA/210) of PCT/JP2023/021925", mailed on Aug. 15, 2023, with English translation thereof, pp. 1-4.

* cited by examiner

*Primary Examiner* — Daniel A Hess
(74) *Attorney, Agent, or Firm* — JCIPRNET

(57) ABSTRACT

A card reader is provided, in which a gate sensor detects that a card has been inserted into an insertion slot, and being conveyed along a conveyance path; a conveyance part has a drive part that conveys the card in an inside of the conveyance path; a conveyance detection sensor detects the card conveyed along the conveyance path; when the conveyance detection sensor is turned from "OFF" to "ON" and then to "OFF" in a state that the gate sensor is "ON", a control part causes the drive part to rotate in a first direction for only a specific time and then rotate in a second direction for only a specific time, and determines the card being pulled out during insertion if a load when the drive part is rotated in the second direction is smaller than a load when the drive part is rotated in the first direction.

7 Claims, 4 Drawing Sheets

CARD READER AND CARD PULLING-OUT DETECTION METHOD

CROSS-REFERENCE TO RELATED APPLICATION

This application is a 371 application of the international PCT application serial no. PCT/JP2023/021925, filed on Jun. 13, 2023, which claims the priority benefits of Japan Patent Application No. 2022-097751, filed on Jun. 17, 2022. The entirety of each of the above-mentioned patent applications is hereby incorporated by reference herein and made a part of this specification.

TECHNICAL FIELD

The present invention especially relates to a card reader which reads a card and a card pulling-out detection method.

BACKGROUND ART

Conventionally, a card reader/writer (hereinafter, simply referred to as a "card reader") exists which reads information from a card-shaped medium (hereinafter, simply referred to as a "card") and writes information. A card reader includes a magnetic head which writes magnetic information to a card, sensors which detect a position of the card in an inside of a conveyance path and the like.

As an example of a conventional card reader, referring to Patent Literature 1, a manual type card processing device, in other words, a card reader is described in which a card is manually operated by a user and includes a card insertion part into which a card is inserted, a card accommodation part which accommodates the card in a state that a rear end part of the inserted card is exposed from the card insertion part, a reading part which reads recorded information of the card accommodated in the card accommodation part, a first detection part which detects the card having been inserted to the card accommodation part through the card insertion part, a second detection part which is disposed on a rear side in an insertion direction of the card with respect to the first detection part and detects that the card has been inserted, and a state monitoring part which detects a fraud according to a detected relationship of the first detection part and the second detection part with respect to the card.

On the other hand, there is also a motor conveyance type card reader in which a card is conveyed by a drive part such as a motor. In such a motor conveyance type card reader, commonly, when a card is detected by a card insertion part, the card is inserted into an inside of a conveyance path by the drive part and is read.

CITATION LIST

Patent Literature

Patent Literature 1: Japanese Patent Laid-Open No. 2018-055573

SUMMARY OF THE INVENTION

Problems to be Solved by the Invention

Even in a motor conveyance type card reader, a card during insertion may be pulled out by a user for some reason. In this case, an error has occurred by the state monitoring like the card reader described in Patent Literature 1 and thus, a service person is required to be called.

In view of the problem described above, the present invention provides a motor conveyance type card reader which detects a card being pulled out during insertion by a user.

Means to Solve the Problems

A card reader in accordance with an embodiment of the present invention includes an insertion slot into which a card is inserted, an insertion detection sensor which detects that the card has been inserted into the insertion slot, a conveyance path where the card inserted through the insertion slot is conveyed, a conveyance part which has a drive part and conveys the card in an inside of the conveyance path, a conveyance detection sensor which detects the card conveyed along the conveyance path, and a control part configured to: cause the drive part to rotate in a first direction only for a specific time in a case that the conveyance detection sensor is turned from "OFF" to "ON" and then to "OFF" in a state that the insertion detection sensor is "ON", then, cause the drive part to rotate in a second direction only for the specific time, and perform a determination that the card is being pulled out during insertion in a case that a load when the drive part is rotated in a direction that the card is moved toward the insertion slot is smaller than a load when rotated in a reverse direction.

According to this configuration, pulling-out of a card during insertion by a user can be detected.

A card reader in accordance with an embodiment of the present invention is structured, so that the control part is configured to perform the determination during a rotation time in the first direction and a rotation time in the second direction by calculating: an acceleration time reaching a target speed, a presence/absence of a stall during acceleration, and a torque output of the drive part after completion of acceleration.

According to this configuration, it can be surely determined whether a card is being pulled out during insertion or abnormality has occurred.

In the card reader in accordance with an embodiment of the present invention, the first direction is a forward rotation direction for conveying the card in an inserting direction, and the second direction is a reverse rotation direction for conveying the card in an ejecting direction.

According to this configuration, it can be surely detected that a load is applied to the drive part by pulling-out.

A card reader in accordance with an embodiment of the present invention is structured, so that the control part is configured to determine that the card is being pulled out during insertion, further as conditions of the determination, when one of following conditions has occurred:

- a case that the acceleration time in the forward rotation direction becomes larger than a value obtained by adding an acceleration threshold to the acceleration time in the reverse rotation direction,
- a case that a stall has occurred during acceleration in the forward rotation direction,
- a case that the torque output of the drive part after completion of acceleration in the forward rotation direction becomes larger than a value obtained by adding a torque threshold to the torque output of the drive part after completion of acceleration in the reverse rotation direction, and a case that the torque output of the drive part after completion of acceleration in the forward rotation direction reaches a limit value.

According to this configuration, it can be surely detected that a card has been pulled out during insertion.

A card reader in accordance with an embodiment of the present invention is structured, so that the control part is configured to determine that the card is not pulled out during insertion, further as conditions of the determination, when one of the following conditions has occurred:

a case that the acceleration time in the reverse rotation direction becomes larger than a value obtained by adding an acceleration threshold to the acceleration time in the forward rotation direction, a case that the torque output of the drive part after completion of acceleration in the reverse rotation direction becomes larger than a value obtained by adding a torque threshold to the torque output of the drive part after completion of acceleration in the forward rotation direction, and a case that the torque output of the drive part after completion of acceleration in the reverse rotation direction reaches a limit value.

According to this configuration, it can be surely detected that abnormality except pulling-out of a card during insertion has occurred.

A card pulling-out detection method in accordance with an embodiment of the present invention is a card pulling-out detection method executed in a card reader which includes an insertion slot into which a card is inserted, an insertion detection sensor which detects that the card has been inserted into the insertion slot, a conveyance path where the card inserted through the insertion slot is conveyed, a conveyance part which has a drive part and conveys the card in an inside of the conveyance path, and a conveyance detection sensor which detects the card conveyed along the conveyance path. The card pulling-out detection method includes: causing the drive part to rotate in a first direction only for a specific time in a case that the conveyance detection sensor is turned from "OFF" to "ON" and then to "OFF" in a state that the insertion detection sensor is "ON"; then, causing the drive part to rotate in a second direction only for the specific time; and determining that the card has been pulled out during insertion in a case that a load when the drive part is rotated in a direction that the card is moved toward the insertion slot is smaller than a load when the drive part is rotated in a reverse direction.

According to this configuration, pulling-out of a card during insertion by a user can be detected.

Effects of the Invention

According to an embodiment of the present invention, in a case that the conveyance detection sensor is turned from "OFF" to "ON" and then to "OFF" in a state that the insertion detection sensor is "ON", the drive part is rotated in a first direction only for a specific time and then, rotated in a second direction only for the specific time and, in a case that a load when the drive part is rotated in a direction that the card is moved toward the insertion slot is smaller than a load when rotated in a reverse direction, it is determined that the card is being pulled out during insertion. Therefore, a motor conveyance type card reader which detects pulling-out of a card by a user during insertion can be provided.

DESCRIPTION OF EMBODIMENTS

Embodiment

[Structure of Card Reader 1]

Figure 1:
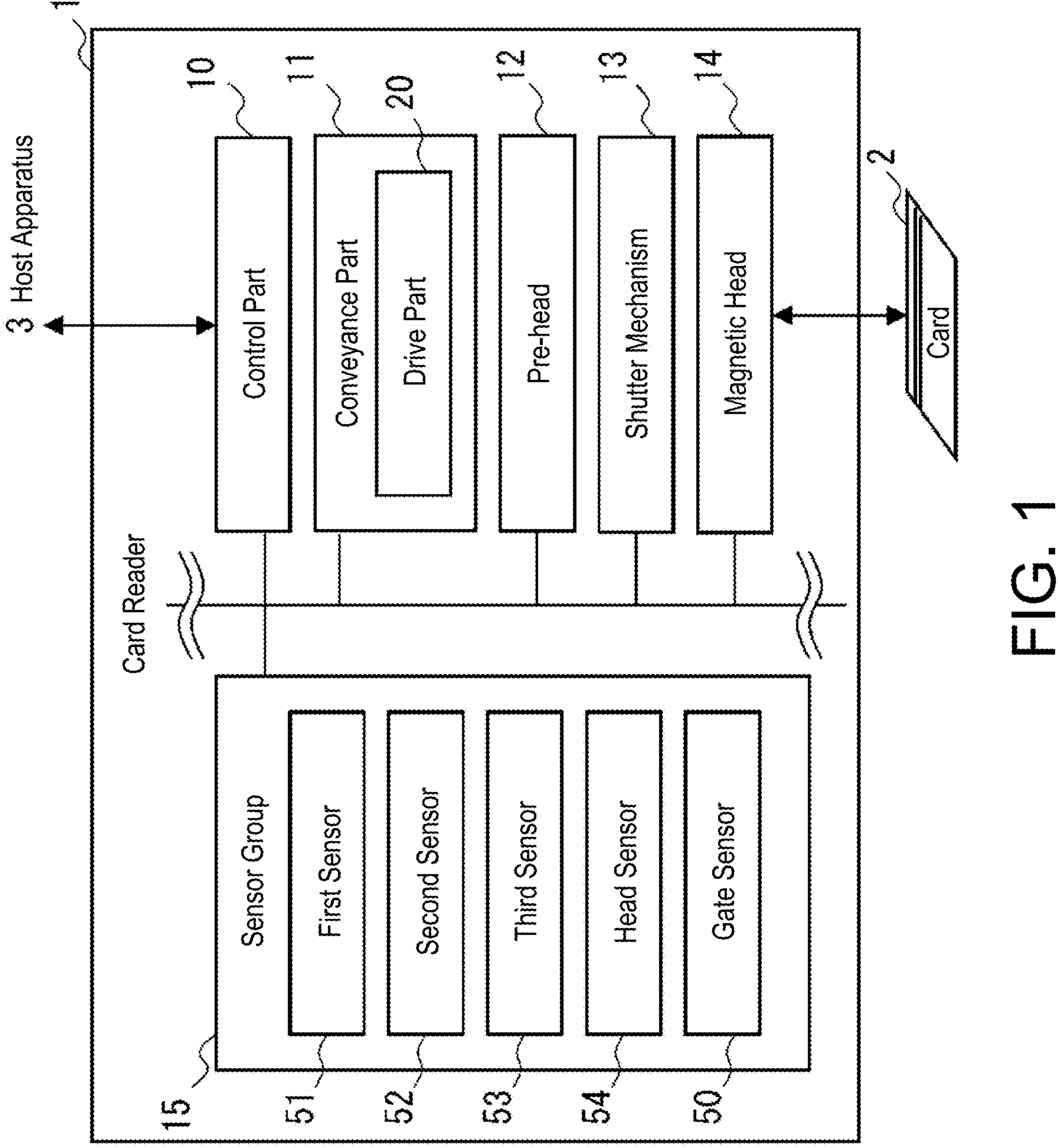
FIG. 1 is a system configuration diagram showing a card reader in accordance with an embodiment of the present invention.

An example of a structure of an embodiment of a card reader 1 in accordance with the present invention will be described below with reference to FIG. 1 and FIG. 2.

The card reader 1 is, in this embodiment, an example of a card reader which is connected with an ATM, a terminal of a kiosk (Kiosk), a ticket issue system of means of transportation, a point card issue system of a convenience store and the like, a member card issue system of a retail store, a card issue/payment system of a game machine, an entrance/exit management system and the like (hereinafter, simply referred to as an "ATM or the like").

First, a control configuration of a card reader 1 will be described below with reference to FIG. 1. The card reader 1 is, for example, a motor conveyance type (automatic) card reader/writer device which is capable of reading (read) and writing (write) information to a card 2. In this case, the card reader 1 performs reading and writing of a magnetic signal to the card 2 for settlement with the card 2. In addition, the card reader 1 may be capable of encrypting and decrypting information which is to be read or written.

The card reader 1 in this embodiment is connected with a host apparatus 3 and is structured to perform reading and writing to the card 2 according to instructions of the host apparatus 3. The card reader 1 is, for example, capable of connecting with the host apparatus 3 by a USB (Universal Serial Bus), RS-232C or the like.

The card 2 is a contact type or a non-contact type IC card and/or a magnetic card provided with a magnetic stripe to which magnetic recording can be performed, or the like. The card 2 is, for example, a rectangular card made of vinyl chloride whose thickness is about 0.7-0.8 mm. The card 2 is, for example, formed with a magnetic stripe in which magnetic data are recorded. Further, the card 2 may be, for example, provided with a built-in IC chip. In this case, the card 2 may be provided with both of an IC and a magnetic stripe. In accordance with an embodiment of the present invention, the card 2 may be a PET (polyethylene terephthalate) card whose thickness is about 0.18-0.36 mm, a paper card having a predetermined thickness, or the like. The card 2 stores information of a user "P", currency value information and the like.

The host apparatus 3 is an embedded PC (Embedded Personal Computer) such as an ATM, an FC (Factory Computer), a server or the like.

In this embodiment, the host apparatus 3 is provided with a touch panel display or the like which is operated by a user "P" to control the card reader 1 and instructs settlement or issue of a card 2.

The card reader 1 in this embodiment may include an IC contact block which reads and writes IC information of an IC card, an RF (Radio Frequency) antenna or an electromagnetic induction antenna corresponding to reading and writing of information to a non-contact type IC card, circuits therefor and the like.

Further, the card reader 1 may include a card printer unit such as an ink ribbon type thermal transfer printer, an inkjet printer, a dot matrix printer, an imprinting device or the like by which a card 2 is printed in color or black and white.

In addition, the card reader 1 may include an image reader (scanner) which performs optical reading of a photograph, characters and the like optically described on a card 2.

In addition, the card reader 1 may be connected with a card hopper in which a plurality of cards 2 is stored and a stored card 2 is sent toward the card reader 1, or the like.

Further, in addition, the card reader 1 may be connected with a collection container for collecting cards 2, a crusher for crushing the collected card 2, and the like.

Next, a control configuration of the card reader 1 will be described in further detail below.

The card reader 1 is structured so as to mainly include a control part 10, a conveyance part 11, a pre-head 12, a shutter mechanism 13, a sensor group 15 and a magnetic head 14.

The control part 10 controls the entire card reader 1. The control part 10 is, for example, a control calculation means such as a CPU (Central Processing Unit), an MPU (Micro Processing Unit), a GPU (Graphics Processing Unit), a DSP (Digital Signal Processor), and an ASIC (Application Specific Integrated Circuit).

The control part 10 includes a non-transitory recording medium such as a nonvolatile ROM (Read Only Memory) and a volatile RAM (Random Access Memory).

The ROM is a nonvolatile memory which stores data, a control program and the like required for various operations of the card reader 1. Further, the ROM may be, for example, a non-transitory rewritable recording medium such as an EEPROM (Electrically Erasable Programmable ROM) and a flash memory (Flash Memory). In this embodiment, the ROM may store, as data, characteristic values, an acceleration threshold, a stall threshold, a torque threshold, a limit value, other set values relating to motor output characteristics of a drive part 20 described below.

The RAM is used as a working area and the like when the control part 10 executes a program stored in the ROM. The RAM stores detection states of respective sensors of the sensor group 15, time-series data of values of an encoder, temporary data including data of torque outputs and the like, history data of processing that the control part 10 has executed until immediately before, communication data with the host apparatus 3 and the like.

The control part 10 executes processing based on a control program and data stored in the ROM. As a result, respective parts of the card reader 1 are controlled. In addition, in this embodiment, the control part 10 is capable of calculating a torque output of the drive part 20 based on a duty ratio (Duty) and the like when the drive part 20 of the conveyance part 11 is PWM controlled.

The conveyance part 11 is a mechanism which includes the drive part 20 and conveys a card 2 in an inside of a conveyance path "C" (FIG. 2) of the card reader 1.

Detail of the Conveyance Part 11 is Described Below.

The pre-head 12 is a magnetic head or the like which is used only to detect that a card of a user "P" other than a card 2 is inserted into the card reader 1. The pre-head 12 is disposed in an inside of a card insertion part which structures a front end side portion of the card reader 1.

The shutter mechanism 13 is a mechanism which drives a shutter member for preventing dust outside and a foreign matter from entering. The shutter mechanism 13 is, for example, disposed in the card insertion part of the card reader 1. The shutter mechanism 13 moves the shutter member between a closed position where the conveyance path "C" is closed and an open position where the conveyance path "C" is opened by power of a solenoid (not shown).

The magnetic head 14 is a magnetic head which performs reading and writing of a card 2 conveyed by the conveyance part 11.

The magnetic head 14 in this embodiment writes new magnetic data to a magnetic stripe or reads recorded magnetic data by contacting and sliding on a magnetic stripe formed on a card 2. Therefore, the magnetic head 14 is connected with a demodulation IC which is an electronic component for demodulation that demodulates an analog-shaped output signal outputted to create a digital-shaped demodulated signal and is connected with the control part 10 through the demodulation IC.

The magnetic head 14 may be an encryption magnetic head corresponding to encryption of a magnetic signal.

The sensor group 15 is a plurality of sensors for detecting a position of a card 2 which is conveyed in an inside of the card reader 1. The sensor group 15 may include, for example, an optical sensor structured of a light-emitting part having a light emitting element (photo diode) and a light-receiving part having a light receiving element (photo sensor), a piezoelectric sensor which detects pressing pressure when contacted with a card 2, a physical switch (hereinafter, simply referred to as a "switch"), a capacitance sensor which detects capacitance of a card 2, and the like. Each sensor of the sensor group 15 is disposed at a plurality of positions different from each other in the inside of the conveyance path "C" and thereby, a position of a card 2 in the conveyance path "C" can be detected in detail.

Detail of an arrangement of the respective sensors of the sensor group 15 will be also described below.

Next, also with reference to an outward side appearance structure in FIG. 2, detail and a positional relationship of the sensor group 15 of the card reader 1 in this embodiment will be described below.

Figure 2:
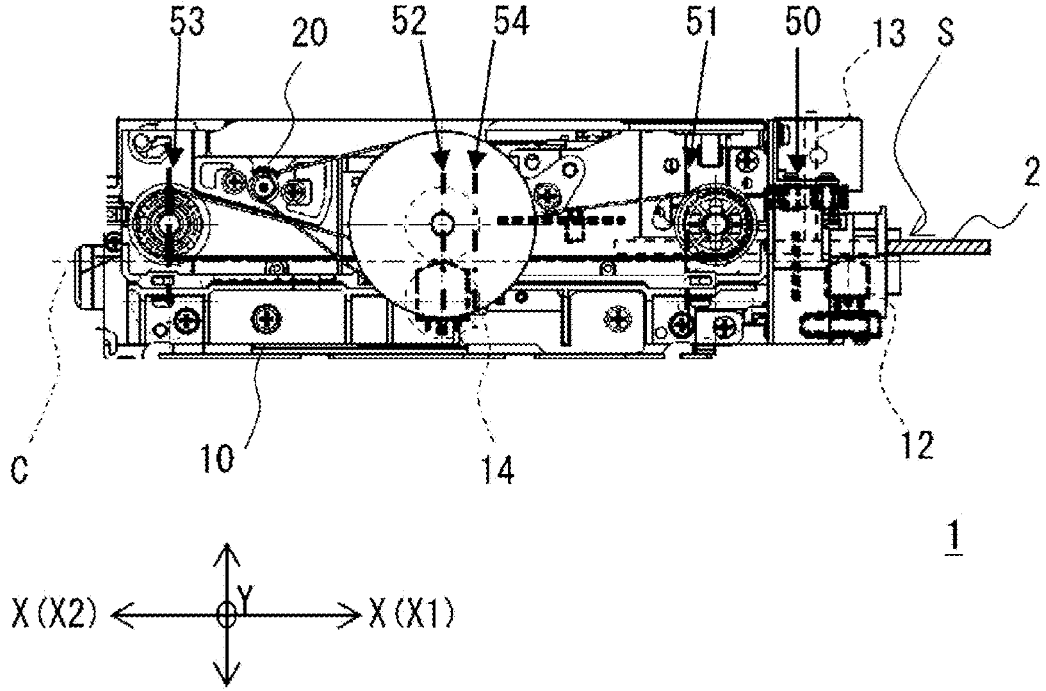
FIG. 2 is a substantially cross-sectional side view showing the card reader in FIG. 1.

In FIG. 2, the "X"-direction is a front and rear direction of the card reader 1, the "Z"-direction is an upper and lower direction of the card reader 1, and the "Y"-direction is a right and left direction of the card reader 1 which is perpendicular to the front and rear direction and the upper and lower direction. A side of the "X1"-direction (pulling-out direction, ejecting direction) in the front and rear direction is a front side (front) of the card reader 1, and a side of the "X2"-direction (pulling-in direction, inserting direction) which is the opposite side is a back side (rear side, rear) of the card reader 1.

The card reader 1 is mounted on the host apparatus 3 so that a front end side (near side) of the card reader 1 is disposed on a front face side of the ATM or the like.

In addition, hereinafter, in the description of this embodiment, an end in a direction ("X2"-direction) where a card 2 is conveyed in the inside of the conveyance path "C" from an insertion slot "S" provided on the front end side (near side) toward a rear side is referred to as a tip end, and an end on a side where the card 2 is ejected toward the front side ("X1"-direction) to the insertion slot "S" is referred to as a rear end.

As shown in FIG. 2, the card reader 1 is provided with the insertion slot "S" into which a card 2 is inserted and from which the card 2 is ejected and is formed with the conveyance path "C" in the inside of the card reader 1. The conveyance path "C" is conveyed with a card 2 which is inserted from the insertion slot "S". Further, the pre-head 12, the shutter mechanism 13 and the magnetic head 14 are respectively provided from a front side to a rear side in the conveyance path "C". The pre-head 12 and the magnetic head 14 are disposed so as to face the conveyance path "C" from an upper side and/or a lower side.

Next, detail of the conveyance part 11 in this embodiment will be described below.

The conveyance part 11 conveys a card 2 in the inside of the conveyance path "C". The conveyance part 11 is, for example, structured of a conveyance mechanism including the drive part 20, pulleys, a belt, rollers and the like.

The drive part 20 is a stepping motor or the like which transmits a drive force to pulleys through a drive belt. A rotary encoder (hereinafter, simply referred to as an encoder) is attached to a shaft of the drive part 20 and is capable of detecting a rotation position and a speed of the shaft of the drive part 20. In accordance with an embodiment of the present invention, the driving part 20 may include a torque sensor which detects a torque output of the shaft.

The pulley is a pulley or a gear which is rotatably supported by a housing of the card reader 1.

The belt is a power transmitting belt which is connected between rollers and is made of rubber, elastomer or the like.

The sensor group 15 is arranged so that a gate sensor 50, a first sensor 51, a head sensor 54, a second sensor 52 and a third sensor 53 are disposed from a front side to a rear side in this order in the inside of the conveyance path "C".

The gate sensor 50 is an example of an insertion detection sensor in this embodiment and detects that a card 2 has been inserted into the insertion slot "S" or has been ejected. In this embodiment, for example, the gate sensor 50 may be a switch, an optical sensor, a capacitance sensor or the like which detects that a card 2 having passed through the pre-head 12 has passed a shutter of the shutter mechanism 13.

The first sensor 51 is an example of a conveyance detection sensor which detects a card 2 which is conveyed along the conveyance path "C" in this embodiment. The first sensor 51 is provided in the vicinity of a roller on a front side.

In this embodiment, the first sensor 51 is used for determining whether a card 2 has been pulled out or not after a tip end of the card 2 is inserted through the insertion port "S" and is detected by the gate sensor 50 and before the tip end of the card 2 reaches the magnetic head 14.

The second sensor 52 is a sensor which is provided in the vicinity of a roller on a rear side. In this embodiment, the second sensor 52 is used for determining whether or not a card 2 has been normally conveyed at a time of writing/reading to/from the card 2 by the magnetic head 14.

The third sensor 53 is a sensor which detects a position of the card 2 reaching a rear end of the conveyance path "C". In other words, the third sensor 53 is a sensor which is disposed on a rear side of the conveyance path "C" with respect to the magnetic head 14 and detects a position of the card 2 conveyed along the conveyance path "C".

In this embodiment, the third sensor 53 is capable of detecting the card 2 which is conveyed and reaches a rear end of the conveyance path "C".

The head sensor 54 is a sensor which is provided on a front side with respect to the second sensor 52 for detecting a state that a tip end of the card 2 has reached the magnetic head 14. When the card 2 is detected by the head sensor 54, reading and/or writing of magnetic data are started.

Each sensor of the sensor group 15 may detect a card 2 having been inserted, in a case of an optical sensor, for example, by intercepting an optical path between a light-emitting part and a light-receiving part by the card 2. In a case of a switch, it may be capable of detecting a card 2 by utilizing that piezoelectricity is generated by pressing of a card 2, or that a current value is changed by conduction of the switch. In a case of a capacitance sensor, a card 2 may be detected when capacitance is changed by the card 2.

In addition, in this embodiment, an example is described that, when a card 2 is detected, each sensor becomes a state of "ON" and, when the card 2 is not detected, each sensor is in a state of "OFF".

Next, functional configurations of the control part 10 in this embodiment will be described below. In this embodiment, the control part 10 causes the drive part 20 to rotate in the first direction for a specific time and then rotate in the second direction for a specific time in a case that the first sensor 51 is changed from "OFF" to "ON" and then to "OFF" in a state that the gate sensor 50 is "ON". In this case, in a case that a load when the drive unit 20 is rotated in a direction (card ejection direction) in which the card 2 is moved to the insertion slot "S" is smaller than a load when rotated in the reverse direction (card insertion direction), the control part 10 determines that the card 2 has been pulled out during insertion.

Specifically, the control part 10 may perform a determination during a rotation time in the first direction and a rotation time in the second direction by calculating: an acceleration time until a target speed is reached, a presence/absence of a stall during the acceleration, and a torque output of the drive part 20 after the acceleration is completed.

In this embodiment, the first direction may be a forward rotation direction which conveys a card 2 in an insertion direction, and the second direction may be a reverse rotation direction which conveys the card 2 in an ejection direction.

More specifically, the control part 10 is capable of determining that a card 2 has been pulled out during insertion further under one of the following determination conditions has occurred;

- a condition (A): a case that an acceleration time in a forward rotation direction becomes larger than a value obtained by adding an acceleration threshold to an acceleration time in the reverse rotation direction,
- a condition (B): a case that a stall has occurred during acceleration in the forward rotation direction,
- a condition (C): a case that a torque output of the drive part 20 after completion of acceleration in the forward rotation direction becomes larger than a value obtained by adding a torque threshold to a torque output of the drive part 20 after completion of acceleration in the reverse rotation direction, and
- a condition (D): a case that a torque output of the drive part 20 after completion of acceleration in the forward rotation direction has reached a limit value.

In addition, the control part 10 may be capable of determining that a card 2 is not pulled out during insertion further under one of the following determination conditions has occurred;

- a condition (E): a case that an acceleration time in the reverse rotation direction becomes larger than a value obtained by adding an acceleration threshold to an acceleration time in the forward rotation direction,
- a condition (F): a case that a torque output of the drive part 20 after completion of acceleration in the reverse rotation direction becomes larger than a value obtained by adding a torque threshold to a torque output of the drive part 20 after completion of acceleration in the forward rotation direction, and a condition (G): a case that a torque output of the drive part 20 after completion of acceleration in the reverse rotation direction has reached a limit value.

In this embodiment, in a case that the control part 10 determines that a card 2 is not pulled out during insertion, the control part 10 may determine that, for example, a risk on security has occurred as abnormality occurrence.

[Card Pulling-Out Detection Processing]

Figure 3:
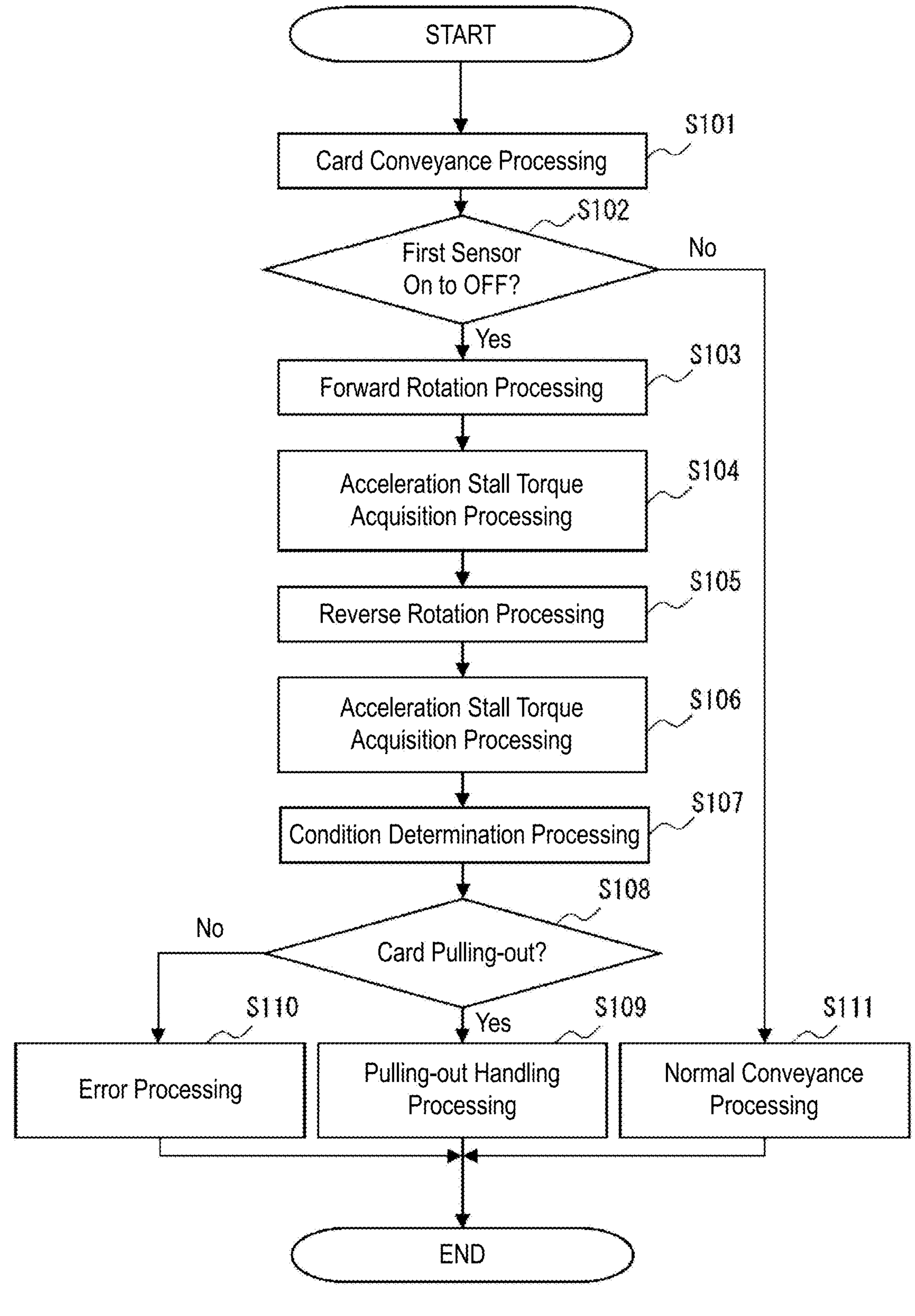
FIG. 3 is a flow chart showing card pulling-out detection processing in accordance with an embodiment of the present invention.

Next, a card pulling-out detection processing in accordance with an embodiment of the present invention will be described below with reference to FIG. 3 and FIG. 4. The card pulling-out detection processing is processing in which the control part 10 executes a card pulling-out detection method in this embodiment.

In the card pulling-out detection processing in this embodiment, the gate sensor 50 detects that a card 2 is inserted through the insertion slot "S". In a state that the gate sensor 50 is "ON", when the first sensor 51 is turned from "OFF" to "ON" and then to "OFF", the drive part 20 is rotated in the first direction for a specific time. After that, the drive part 20 is rotated in the second direction for a specific time and, in a case that a load when the drive part 20 is rotated in a direction so that a card 2 is moved to the insertion slot "S" is smaller than a load in a case that the drive part 20 is rotated in the reverse direction, it is determined that the card 2 has been pulled out during insertion.

The card pulling-out detection processing in this embodiment is performed so that the control part 10 mainly executes a control program stored in a built-in storage medium in cooperation with respective parts by using hardware resources.

Detail of the card pulling-out detection processing in this embodiment will be described below for each step with reference to the flow chart shown in FIG. 3.

(Step S101)

First, the control part 10 performs card conveyance processing.

The control part 10 detects that a card 2 has been inserted from the insertion slot "S" by the gate sensor 50.

Then, the control part 10 performs initialization processing of the card reader 1 to rotate the drive part 20 of the conveyance part 11 in a forward direction. As a result, the control part 10 conveys the card 2 toward the magnetic head 14 of the card reader 1 from a front side ("X1"-direction) in an inside of the conveyance path "C" to a rear side ("X2"-direction).

Therefore, the card 2 is conveyed toward the first sensor 51 in a state that the gate sensor 50 is "ON". As a result, it is confirmed by the pre-head 12 that the card 2 is a magnetic card having a magnetic stripe. After that, a tip end of the card 2 reaches the first sensor 51 and the first sensor 51 is turned from "OFF" to "ON".

Figure 4:
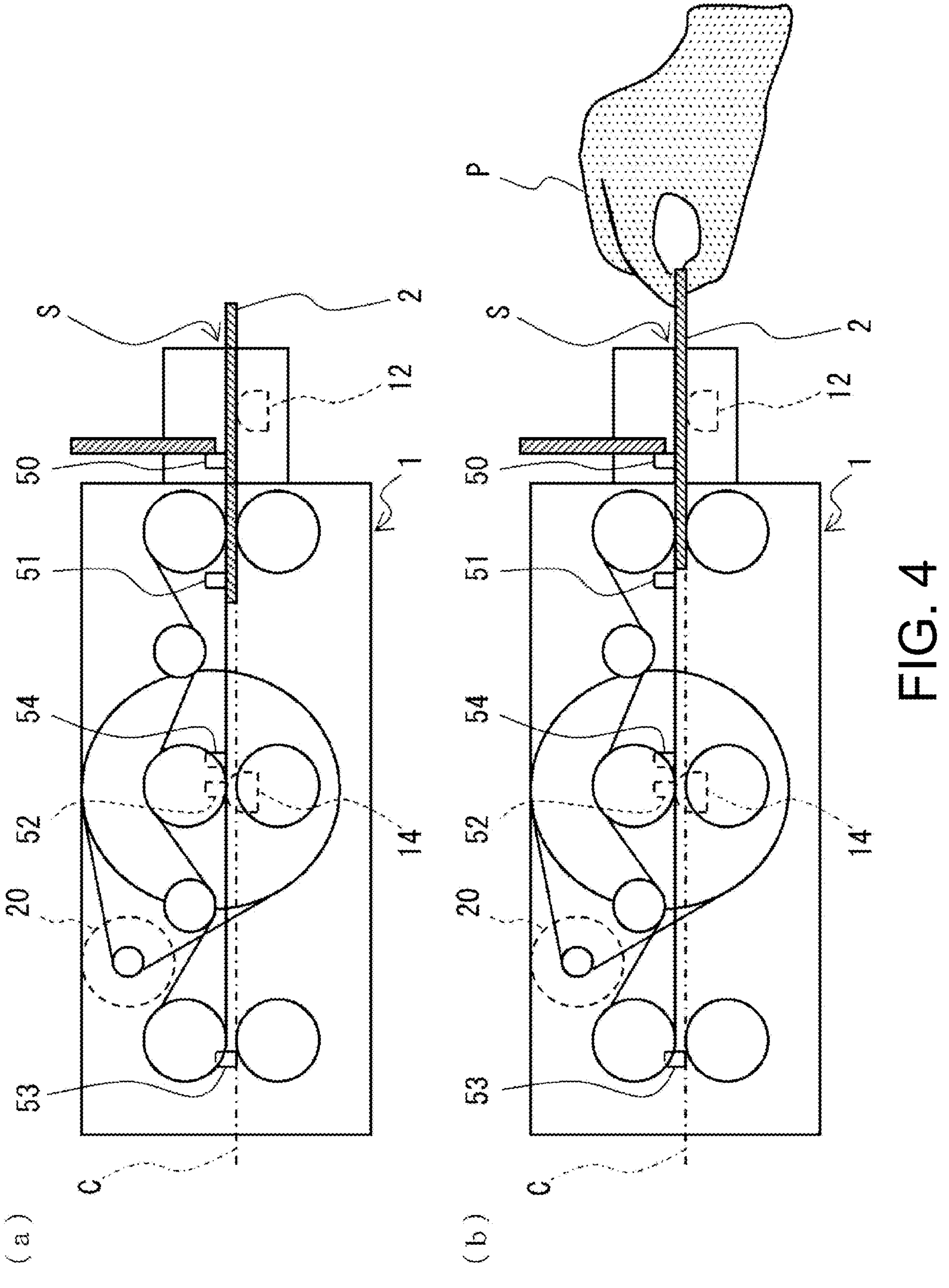
FIG. 4 are conceptual views showing the card pulling-out detection processing shown in FIG. 3.

In FIG. 4, (a) shows the card 2 in this state.

(Step S102)

Next, the control part 10 determines whether or not the first sensor 51 is turned from "OFF" to "ON" and then to "OFF".

The control part 10 detects a case as an abnormal state in which the first sensor 51 is turned from "OFF" to "ON" in a state that the gate sensor 50 is in an "ON" state, but is turned to "OFF" again as described above, and the control part 10 determines as "Yes".

As an example of a card 2 in this state, in FIG. 4, (b) shows a state that a card 2 is going to be pulled out during insertion by a user "P" for some reason, for example, the user "P" intends to employ another card.

On the other hand, in other cases, in other words, in a case of a normal state that the first sensor 51 becomes "ON" from "OFF" and the card 2 is conveyed to a rear side and then, the gate sensor 50 is turned to "OFF", the control part 10 determines as "No". The control part 10 also determines as "No" in other cases such as still during conveyance.

In the case of "Yes", the control part 10 advances the processing to the step S103.

In the case of "No", the control part 10 advances the processing to the step S111.

(Step S103)

In the case that the first sensor 51 is turned from "OFF" to "ON" and then to "OFF" in a state that the gate sensor 50 is "ON", the control part 10 performs a forward rotation processing.

In a case that the conveyance part has already rotating in a direction for conveying a card 2 in the insertion direction (forward rotation direction) when the change of the gate sensor 50 is detected, for example, during a card taking-in operation, the control part 10 stops temporarily.

After that, the control part 10 rotates the drive part 20 only for a specific time in the forward rotation direction. The specific time may be, for example, about several milliseconds through ten and several seconds.

(Step S104)

Next, the control part 10 performs acceleration stall torque acquisition processing.

The control part 10 acquires characteristic values relating to motor output characteristics of the drive part 20.

In this embodiment, the control part 10 calculates (i): an acceleration time until reaching a target speed. Specifically, the control part 10 may, for example, acquire values of an encoder during rotation as time-series data and thereby, calculates angular velocity, and calculates a time until the angular velocity reaches a target speed as the acceleration time. The target speed may be, for example, a normal conveyance speed at a time of conveyance of a card 2 in the inside of the conveyance path "C". In addition, as the normal conveyance speed, an appropriate value may be set based on a torque output of a motor of the drive part 20 or the like.

Next, the control part 10 acquires (ii): presence/absence of a stall during acceleration from the time-series data. The control part 10 may calculate an angular acceleration from an angular velocity based on the time-series data and, when the angular acceleration becomes lower than a stall threshold, the control part 10 determines that a stall has occurred. In other words, the control part 10 detects decrease of a conveyance speed (stall "presence") due to pulling-out of a card 2 by a user "P" or the like.

Next, the control part 10 acquires (iii): a torque output after completion of acceleration. Specifically, for example, the control part 10 acquires a torque output after the angular velocity calculated from the time-series data has reached the target speed as a torque output after completion of acceleration. As the torque output, for example, a practical maximum torque output of the drive part 20 may be set as a "limit value".

(Step S105)

Next, the control part 10 performs a reverse rotation processing.

The control part 10 stops the drive part 20 temporarily and then rotates in a reverse rotation direction in which a card 2 is conveyed in an ejecting direction only for a specific time. In this embodiment, the specific time may be a time same as the specific time in the step S103.

(Step S106)

Next, the control part 10 performs acceleration stall torque acquisition processing.

In this processing, similarly to the step S104, the control part 10 calculates and acquires characteristic values relating to motor output characteristics of the drive part 20.

In this case, the control part 10 may acquire a value of an absolute value without a sign for each value.

(Step S107)

Next, the control part 10 performs condition determination processing.

The control part 10 compares items of the following conditions for the acquired characteristic values relating to the motor output characteristics of the drive part 20 in the forward rotation and the reverse rotation.

The condition (A) is: (i) the acceleration time is that "forward rotation≥reverse rotation+acceleration threshold". In other words, the condition (A) is a case that the acceleration time in the forward rotation direction becomes larger than a value obtained by adding an acceleration threshold to the acceleration time in the reverse rotation direction. The acceleration threshold can be appropriately set based on actually acquired acceleration or the like when pulling-out is performed.

The condition (B) is: (ii) a stall has occurred during acceleration in the forward rotation. In other words, the condition (B) is a case that a stall has occurred during acceleration in the forward rotation direction.

The condition (C) is: (iii) a torque output after completion of acceleration is that "forward rotation≥reverse rotation+torque threshold". In other words, the condition (C) is a case that a torque output of the drive part 20 after completion of acceleration in the forward rotation direction becomes larger than a value obtained by adding a torque threshold to the torque output of the drive part 20 after completion of acceleration in the reverse rotation direction. The torque threshold can be appropriately set based on actually acquired torque output or the like when pulling-out is performed.

The condition (D) is: (iii) the torque output after completion of acceleration reaches a limit value in the forward rotation. In other words, the condition (D) is a case that the torque output of the drive part 20 reaches the limit value after completion of acceleration in the forward rotation direction.

The condition (E) is: (i) the acceleration time is that "reverse rotation≥forward rotation+acceleration threshold". In other words, the condition (E) is a case that the acceleration time in the reverse rotation direction becomes larger than a value by adding the acceleration threshold to the acceleration time in the forward rotation direction.

The condition (F) is: (iii) the torque output after completion of acceleration is that "reverse rotation≥forward rotation+torque threshold". In other words, the condition (F) is a case that the torque output of the drive part 20 after completion of acceleration in the reverse rotation direction becomes larger than a value obtained by adding the torque threshold to the torque output of the drive part 20 after completion of acceleration in the forward rotation direction.

The condition (G) is: (iii) the torque output after completion of acceleration reaches a limit value in the reverse rotation. In other words, the condition (G) is a case that the torque output of the drive part 20 reaches the limit value after completion of acceleration in the reverse rotation direction.

(Step S108)

Next, the control part 10 determines whether pulling-out of a card is performed or not based on the above-mentioned conditions. Regarding the above-mentioned respective conditions, when at least one of the conditions (A) through (D) is satisfied and/or the conditions (E) through (G) are not satisfied, the control part 10 judges that the condition is satisfied and pulling-out of a card is performed and thus, "YES" is determined. In other words, when these conditions are satisfied, a load when the drive part 20 is reversely rotated in the ejecting direction ("X1"-direction) in which a card 2 is moved to the insertion slot "S" is smaller than a load when the drive part 20 is forward rotated in the inserting direction ("X2"-direction) that is the reverse direction and thus, the control part 10 is capable of determining as "Yes". In other cases, the control part 10 determines that the card has not pulled out and determines as "No".

In the case of "Yes", the control part 10 advances the processing to a step S109.

In the case of "No", the control part 10 advances the processing to a step S110.

(Step S109)

When pulling-out of a card is performed, the control part 10 performs pulling-out handling processing.

The control part 10 notifies occurrence of pulling-out of a card 2 to the host apparatus 3.

As a result, the host apparatus 3 may display a warning sentence, for example, "not pulling out inserted card" on a display part.

In this case, it is assumed that pulling-out of a card 2 occurs after the card 2 is inserted and thus, the control part 10 may further drives the drive part 20 of the conveyance part 11 in the reverse rotation direction to convey the card 2 to the front side ("X1"-direction) and then, to eject the card 2. In addition, after that, the control part 10 may wait reinsertion of the card 2.

After that, the control part 10 finishes the card pulling-out detection processing.

(Step S110)

When it is determined that pulling-out of a card is not performed, the control part 10 performs error processing.

Although pulling-out of a card is not performed, when the first sensor 51 is turned from "OFF" to "ON" and then to "OFF" in a state that the gate sensor 50 is "ON", the control part 10 determines that abnormality has occurred and performs processing concerning error occurrence.

In this embodiment, the control part 10 notifies an error to the host apparatus 3 by assuming that the gate sensor 50 or the first sensor 51 has failed, alternatively, an abnormal card 2, a member for illegally acquiring information written in a magnetic card, in other words, a member for performing skimming, or an insertion member which is pressed into inside in a standby state (hereinafter, referred to as a skimming member, simply referred to as a "skimmer") is inserted, or the like.

After that, the control part 10 may set in a locked state so as not to perform reading of a card 2.

(Step S111)

In a case of a normal state, the control part 10 performs normal conveyance processing.

The control part 10 continues normal card reading processing and continues driving of the drive part 20 of the conveyance part 11 in the forward rotation direction and continues conveyance of a card 2 to a rear end on the rear side ("X2"-direction).

In other words, the control part 10 detects a tip end of a card 2 by the head sensor 54 and reads a magnetic signal of a magnetic stripe of the card 2 by the magnetic head 14.

Alternatively, the control part 10 may read IC information necessary to an IC of a card 2 by an IC contact block.

Similarly, the control part 10 may read necessary IC information by activating a non-contact IC through an "RF"-antenna or an electromagnetic induction antenna.

In addition, in a case that an image leader is provided, the control part 10 may read an image such as a photograph and characters optically described on a card 2.

The control part 10 conveys the card 2 by the conveyance part 11 until a tip end of the card 2 is detected by the second sensor 52 and then detected by the third sensor 53.

As a result, a magnetic signal is read and transmitted to the host apparatus 3.

After that, the control part 10 ejects the card 2 to the insertion slot "S". Specifically, the control part 10 drives the drive part 20 of the conveyance part 11 in the reverse rotation direction to conveys the card 2 to the front side ("X1"-direction) until the card 2 is ejected.

In this case, an inverted signal of a magnetic signal of the magnetic stripe of the card 2 may be acquired again.

After that, the control part 10 continues conveyance of the card 2 until a rear end of the card 2 is detected by the gate sensor 50 and the first sensor 51 is turned to "OFF". As a result, the card 2 is ejected and stopped in a state that the rear end of the card 2 is protruded from the insertion slot "S".

In this state, an indication that "reading of card is completed and please take out your card from insertion slot "S"" may be displayed on a display part of the host apparatus 3 to a user "P" and the notification may be performed by voice, or the like.

In this way, the card pulling-out detection processing in accordance with an embodiment of the present invention is ended.

Principal Effects in this Embodiment

When structured as described above, the following effects can be obtained.

Conventionally, even in a motor conveyance type card reader, for some reason, for example, when a user "P" inserts a wrong card, or a user "P" intends to employ another card, a card may be pulled out during insertion by the user "P".

If such pulling-out is performed, an error is recognized by the state monitoring in the card reader described in Patent Literature 1 and thus, a service person is required to be called.

On the other hand, (1) The card reader 1 in accordance with an embodiment of the present invention includes the insertion slot "S" into which a card 2 is inserted, the gate sensor 50 which detects that the card 2 has been inserted into the insertion slot "S", the conveyance path "C" where the card 2 inserted through the insertion slot "S" is conveyed, the conveyance part 11 which has the drive part 20 and conveys the card 2 in an inside of the conveyance path "C", the first sensor 51 which detects the card 2 conveyed along the conveyance path "C", and the control part 10 which causes the drive part 20 to rotate in a first direction only for a specific time in a case that the first sensor 51 is turned from "OFF" to "ON" and then to "OFF" in a state that the gate sensor 50 is "ON" and then, causes the drive part 20 to rotate in a second direction only for a specific time and, in a case that a load when the drive part 20 is rotated in a direction that the card 2 is moved toward the insertion slot "S" is smaller than a load when the drive part 20 is rotated in a reverse direction, the control part 10 determining that pulling-out of the card 2 is performed during insertion.

According to the structure described above, a motor conveyance type card reader 1 can be provided which is capable of determining whether a cause of the change from "ON" to "OFF" of the first sensor 51 is due to pulling-out of a card 2 or other reasons (abnormality occurrence). As a result, labor of a service person caused by an abnormal stop state of the card reader 1 due to pulling-out of a card 2 by a user "P" can be reduced and a maintenance cost can be reduced.

In addition, pulling-out of a card 2 during insertion by a user "P" can be almost surely detected without adding special hardware. In other words, even when a hardware configuration is similar to a conventional motor conveyance type card reader, pulling-out of a card 2 can be detected by modifying (updating or adding) software. Therefore, a cost relating to addition of a function can be reduced.

(2) In the card reader 1 in accordance with an embodiment of the present invention, the card reader 1 described in the above-mentioned structure (1) is structured, so that the control part 10 performs a determination during a rotation time in the first direction and a rotation time in the second direction by calculating: an acceleration time until a target speed is reached, a presence/absence of a stall during acceleration, and a torque output of the drive part 20 after completion of acceleration.

According to this configuration, it is surely determined whether a card 2 during insertion is being pulled out or abnormality occurs. In other words, based on acceleration times reaching a target speed, presence/absence of a stall during acceleration, and torque outputs of the drive part 20 after completion of acceleration, a load in the first direction and a load in the second direction can be evaluated precisely and thus, pulling-out can be further surely determined.

(3) In the card reader 1 in accordance with an embodiment of the present invention, the card reader 1 described in the above-mentioned structure (1) or (2) is structured, so that the first direction is a forward rotation direction for conveying a card 2 in an inserting direction, and the second direction is a reverse rotation direction for conveying the card 2 in an ejecting direction.

According to this configuration, a load applied to the drive part 20 due to pulling-out can be surely detected. In other words, commonly, when pulling-out is performed, a load in a case that the drive part 20 is reversely rotated in an ejecting direction ("X1"-direction) so that a card 2 is moved toward the insertion slot "S" is smaller than a load in a case that the drive part 20 is forward rotated in the inserting direction ("X2"-direction) which is a reverse direction. Therefore, pulling-out can be easily detected.

(4) In the card reader 1 in accordance with an embodiment of the present invention, the card reader 1 described in the above-mentioned structure (3) is structured, so that the control part 10 is configured to determine that the card 2 is being pulled out during insertion, further as conditions of the determination, when one of the following conditions has occurred:

(A) a case that the acceleration time in the forward rotation direction becomes larger than a value obtained by adding an acceleration threshold to the acceleration time in the reverse rotation direction, (B) a case that a stall has occurred during acceleration in the forward rotation direction, (C) a case that the torque output of the drive part 20 after completion of acceleration in the forward rotation direction becomes larger than a value obtained by adding a torque threshold to the torque output of the drive part 20 after completion of acceleration in the reverse rotation direction, and (D) a case that a torque output of the drive part 20 after completion of acceleration in the forward rotation direction reaches a limit value.

According to this configuration, pulling-out of a card 2 during insertion can be further surely detected. In other words, it can be surely detected that a load when the drive part 20 is reversely rotated in an ejecting direction ("X1"-direction) is smaller than a case when forward rotated in an inserting direction ("X2"-direction).

(5) In the card reader 1 in accordance with an embodiment of the present invention, the card reader 1 described in the above-mentioned structure (3) or (4) is structured, so that the control part 10 is configured to determine that the card 2 is not pulled out during insertion, further as conditions of the determination, when one of the following conditions has occurred:

(E) a case that the acceleration time in the reverse rotation direction becomes larger than a value obtained by adding an acceleration threshold to the acceleration time in the forward rotation direction, (F) a case that the torque output of the drive part 20 after completion of acceleration in the reverse rotation direction becomes larger than a value obtained by adding a torque threshold to the torque output of the drive part 20 after completion of acceleration in the forward rotation direction, and (G) a case that the torque output of the drive part 20 after completion of acceleration in the reverse rotation direction reaches a limit value.

According to this configuration, when a conveyance detection sensor is turned from "OFF" to "ON" and then to "OFF", a situation except pulling-out of a card 2 during insertion, in other words, abnormality occurrence can be surely detected. As a result, it can be detected that a load is applied different from a case that a card 2 is pulled out during insertion. Therefore, security can be improved.

(6) In the card reader 1 in accordance with an embodiment of the present invention, the card reader 1 described in the above-mentioned structure (5) is structured so that the control part 10 determines that a card is being pulled out in a case that one of the conditions (A) through (D) is satisfied and/or the conditions (E) through (G) are not satisfied as a condition is satisfied.

According to this configuration, it can be surely detected that a card 2 is being pulled out during insertion. In addition, when the conveyance detection sensor is turned from "OFF" to "ON" and then to "OFF", it can be surely detected that abnormality has occurred which is not pulling-out of a card 2 during insertion. As a result, security can be improved while reducing a labor of a service person due to pulling-out.

OTHER EMBODIMENTS

In the embodiment described above, the example is described in which the gate sensor 50 is used as an insertion detection sensor and the first sensor 51 is used as a conveyance detection sensor.

However, it may be structured that a pre-head and/or a head sensor which are disposed at appropriate positions so as to be capable of employing for card detection in the purpose of the present application are used as an insertion detection sensor and/or a conveyance detective sensor.

Specifically, for example, the pre-head 12 may detect a card 2 instead of the insertion detection sensor. In this case, the control part 10 is capable of determining that a card 2 is being pulled out in a case that a magnetic signal of the card 2 has been no longer detected or, in a case that signals corresponding to a position of a tip end of a magnetic stripe is detected.

Further, the control part 10 may be structured to determine that a card 2 is being pulled out also in a case that the card 2 is pulled out to move to a front side ("X1"-direction) and a magnetic signal is detected by the pre-head 12. In addition, the control part 10 may be structured so that continuity of magnetic data which are read by the pre-head 12 is monitored to detect pulling-out or abnormality occurrence. In this case, it may be detected that magnetic data read by the pre-head 12 are reversed.

Alternatively, in a case that the head sensor 54 and the second sensor 52 are used as a conveyance detection sensor, a rear end of a card 2 may be entered into the conveyance path "C". In this case, among the respective conditions, only abnormality occurrence may be determined based on the conditions (F) through (G), or pulling-out may be detected or abnormality occurrence may be determined based on the conditions (A) through (C).

In addition, it may be structured that the second sensor 52 is also used as the conveyance detection sensor.

In addition to this configuration, it may be structured that the gate sensor 50 is additionally used as the insertion detection sensor and the first sensor 51 is additionally used as the conveyance detection sensor.

In other words, one sensor or a combination of a plurality of sensors may be used as the insertion detection sensor and/or the conveyance detective sensor. In addition, it may be structured that the respective sensors of the sensor group 15 are used as the insertion detection sensor and/or the conveyance detective sensor to monitor a state shift.

According to this configuration, pulling-out can be further flexibly detected, and abnormality occurrence can be also surely detected.

Further, in the embodiment described above, pulling-out of a card 2 is detected by the insertion detection sensor and the conveyance detective sensor without adding special hardware.

However, in addition to the above-mentioned respective sensors, pulling-out or abnormality occurrence may be determined by monitoring metal other than an IC chip by using an IC chip sensor, or by monitoring a change of capacitance by using a capacitance sensor.

In addition, a vibration sensor, an acceleration sensor and the like are further added and, in a case that shaking of a housing is detected by the vibration sensor or the acceleration sensor, it may be detected that there is possibility of occurrence of pulling-out of a card 2. In this case, after a card 2 has been inserted, determination of pulling-out may be performed.

According to this configuration, pulling-out of a card 2 or abnormality occurrence can be further surely detected.

Further, in the embodiment described above, the example is mainly described in which pulling-out of a card 2 is detected.

However, insertion of a foreign matter to the card reader 1 may be further positively detected by determining abnormality occurrence other than pulling-out of a card 2. Specifically, a skimmer having been inserted into the card reader 1 may be detected based on the above-mentioned determination of abnormality occurrence.

Specifically, a skimmer has the following features of shape so as not to respond to an optical type sensor when inserted into a card reader:

(1) Since a skimmer main body responds an optical type sensor, a hole avoiding the sensor is opened in a part of the skimmer main body.

(2) A skimmer main body is structured of a transparent sheet or the like and the main body does not respond to an optical type sensor, but a skimming head located on the same straight line as the sensor responds only at a time passing the optical type sensor.

In each case of (1) and (2), the sensor in the conveyance path "C" is turned from "ON" to "OFF" during insertion of the skimmer and thus, it can be determined as the skimmer by detecting the change.

However, conventionally, even in a case that a card 2 is pulled out, a similar change occurs and thus, difference between insertion of the skimmer and pulling-out of a card is not discriminated.

On the other hand, as a cause that the first sensor 51 is turned from "ON" to "OFF", when abnormality occurrence is to be detected after pulling-out of a card 2 is detected, the skimmer can be surely detected. In addition, without requiring additional hardware, a function of skimmer detection can be added or improved by only updating software. In recent years, new skimming has occurred by using a skimmer having a shape and a feature which cannot be detected by a conventional technique. Even in this case, the skimmer can be detected.

In the embodiment described above, the example is described in which the first direction is a forward rotation direction for conveying a card 2 to an inserting direction, and the second direction is a reverse rotation direction for conveying the card 2 to an ejecting direction.

However, the directions may be respectively reversed. In other words, it may be structured that the first direction is a reverse rotation direction and the second direction is a forward rotation direction.

According to this configuration, pulling-out of a card 2 and abnormality occurrence during insertion of the card 2 can be determined by other conditions.

In the embodiment described above, the card reader 1 is described so that reading is performed by inserting a card 2 into the insertion slot "S".

However, it may be structured that, after a host apparatus 3 detects acquisition of some command or the like relating to card reading, reading of a card 2 is performed. In other cases, in a case that insertion or pulling-out of a card 2 is performed, it may be determined as abnormality occurrence.

According to this configuration, pulling-out of a card 2 or abnormality occurrence can be surely determined together with an instruction from the host apparatus 3.

In the embodiment described above, the example is described in which the above-mentioned respective processes are executed by a control program stored in ROM.

However, it may be structured that a control program capable of executing the respective processes is installed for execution to a card reader provided with normal sensor group 15 and thereby, the card reader may be made to function as the card reader 1 which is capable of performing the above-mentioned processes.

For this purpose, firmware including the control program or the like is downloaded and installed by a service person or the like from a recording medium such as a flash memory card or a USB memory where the control program is stored, or from a host apparatus 3 or other servers.

As a result, an existing magnetic card leader is capable of employing as the card reader 1 in this embodiment by changing and updating a control program.

Further, the control part 10 may analyze the above-mentioned time-series data to calculate average values and standard deviations of respective characteristic values relating to motor output characteristics of the drive part 20 at a time of pulling-out of a card 2.

In addition, an acceleration threshold, a torque threshold and a limit value may be calculated and updated by the calculated values.

In addition, pulling-out and abnormality occurrence may be further surely capable of being detected by causing AI such as a multilayer neural network (deep neural network) or a statistical model or the like to learn these values and changes of the values.

In this case, when deviated from an average distance or a standard deviation of average pulling-out of a card 2, an alert may be transmitted to a manager of the card reader 1 regarding necessity of maintenance or possibility that abnormality of the card reader 1 has occurred.

According to this configuration, maintainability and security can be enhanced.

The structure and the operation of the embodiment described above are only an example and it will be understood that many modifications may be made without departing from the spirit thereof.

What is claimed is:

1. A card reader comprising:

an insertion slot into which a card is inserted;

an insertion detection sensor which detects that the card has been inserted into the insertion slot;

a conveyance path where the card inserted through the insertion slot is conveyed;

a conveyance part which comprises a drive part and conveys the card in an inside of the conveyance path;

a conveyance detection sensor which detects the card conveyed along the conveyance path; and a control part configured to:

cause the drive part to rotate in a first direction only for a specific time in a case that the conveyance detection sensor is turned from "OFF" to "ON" and then to "OFF" in a state that the insertion detection sensor is "ON", then, cause the drive part to rotate in a second direction only for a specific time, and perform a determination that the card is being pulled out during insertion in a case that a load when the drive part is rotated in a direction that the card is moved toward the insertion slot is smaller than a load when the drive part is rotated in a reverse direction.

2. The card reader according to claim 1, wherein the control part is configured to perform the determination during a rotation time in the first direction and a rotation time in the second direction by calculating:

an acceleration time until a target speed is reached, a presence/absence of a stall during acceleration, and a torque output of the drive part after completion of acceleration.

3. The card reader according to claim 2, wherein the first direction is a forward rotation direction for conveying the card in an inserting direction, and the second direction is a reverse rotation direction for conveying the card in an ejecting direction.

4. The card reader according to claim 3, wherein the control part is configured to determine that the card is being pulled out during insertion, further as conditions of the determination, when one of following conditions has occurred:

a case that the acceleration time in the forward rotation direction becomes larger than a value obtained by adding an acceleration threshold to the acceleration time in the reverse rotation direction, a case that a stall has occurred during acceleration in the forward rotation direction, a case that the torque output of the drive part after completion of acceleration in the forward rotation direction becomes larger than a value obtained by adding a torque threshold to the torque output of the drive part after completion of acceleration in the reverse rotation direction, and a case that the torque output of the drive part after completion of acceleration in the forward rotation direction reaches a limit value.

5. The card reader according to claim 4, wherein the control part is configured to determine that the card is not pulled out during insertion, further as conditions of the determination, when one of the following conditions has occurred:

a case that the acceleration time in the reverse rotation direction becomes larger than a value obtained by adding an acceleration threshold to the acceleration time in the forward rotation direction, a case that the torque output of the drive part after completion of acceleration in the reverse rotation direction becomes larger than a value obtained by adding a torque threshold to the torque output of the drive part after completion of acceleration in the forward rotation direction, and a case that the torque output of the drive part after completion of acceleration in the reverse rotation direction reaches a limit value.

6. The card reader according to claim 3, wherein the control part is configured to determine that the card is not pulled out during insertion, further as conditions of the determination, when one of the following conditions has occurred:

a case that the acceleration time in the reverse rotation direction becomes larger than a value obtained by adding an acceleration threshold to the acceleration time in the forward rotation direction, a case that the torque output of the drive part after completion of acceleration in the reverse rotation direction becomes larger than a value obtained by adding a torque threshold to the torque output of the drive part after completion of acceleration in the forward rotation direction, and a case that the torque output of the drive part after completion of acceleration in the reverse rotation direction reaches a limit value.

7. A card pulling-out detection method executed in a card reader which comprises an insertion slot into which a card is inserted, an insertion detection sensor which detects that the card has been inserted into the insertion slot, a conveyance path where the card inserted through the insertion slot is conveyed, a conveyance part which comprises a drive part and conveys the card in an inside of the conveyance path, and a conveyance detection sensor which detects the card which is conveyed along the conveyance path, the card pulling-out detection method comprising:

in the card reader, causing the drive part to rotate in a first direction only for a specific time in a case that the conveyance detection sensor is turned from "OFF" to "ON" and then to "OFF" in a state that the insertion detection sensor is "ON";

then, causing the drive part to rotate in a second direction only for a specific time, and determining that the card is being pulled out during insertion in a case that a load when the drive part is rotated in a direction that the card is moved toward the insertion slot is smaller than a load when the drive part is rotated in a reverse direction.

* * * * *